UNITED STATES PATENT OFFICE.

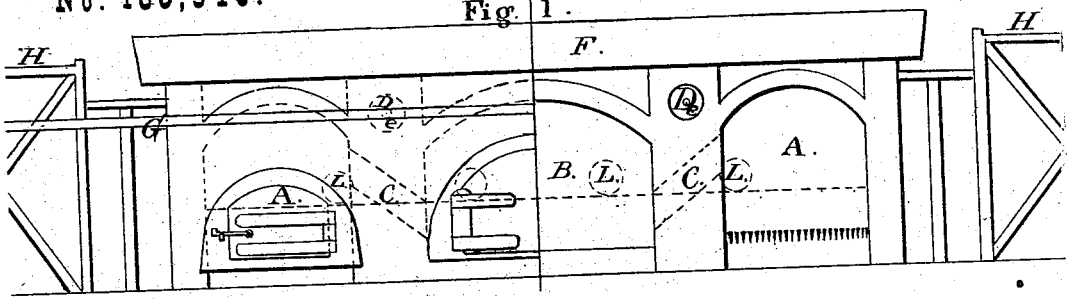
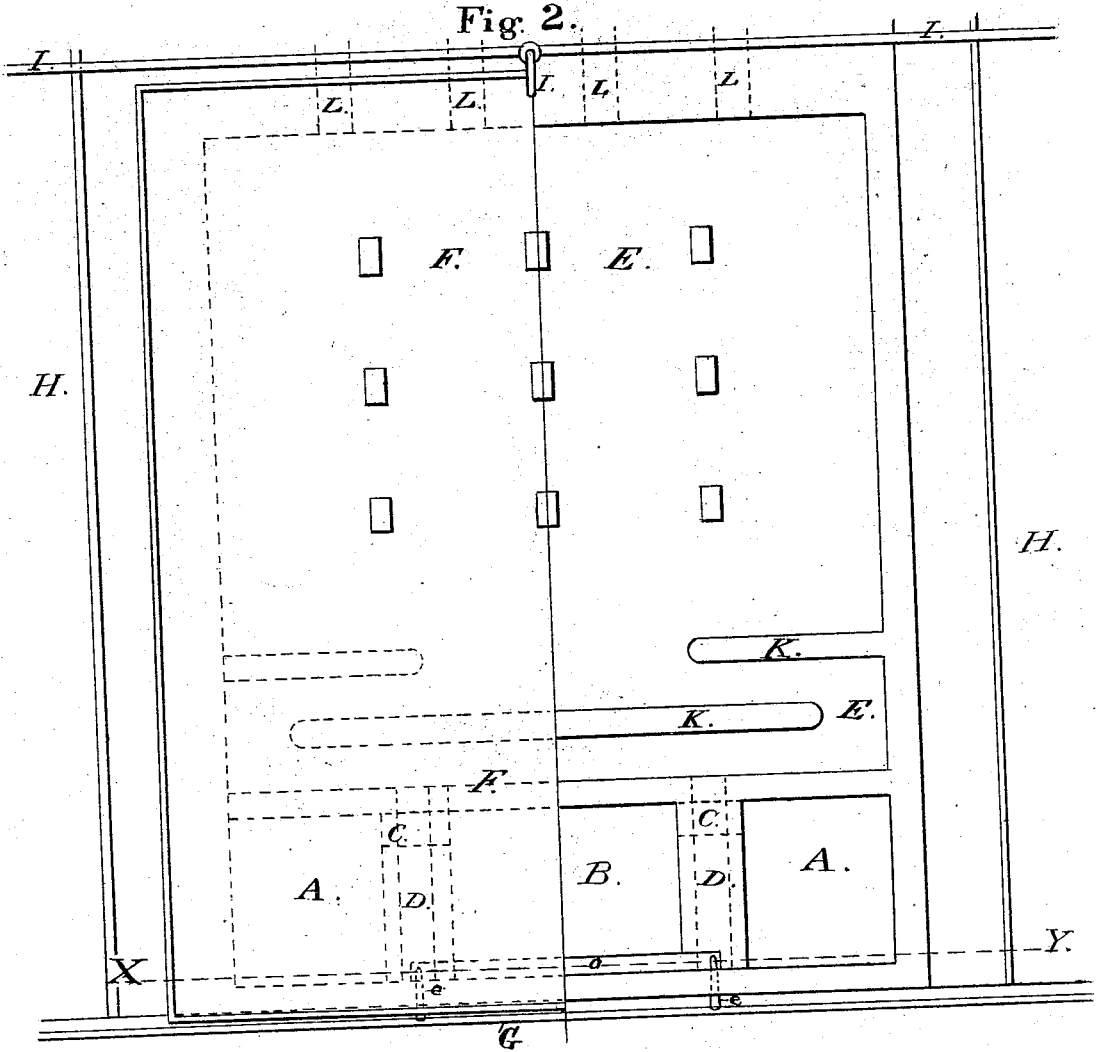

JAMES T. LOCKEY, OF NORTHWICH, ENGLAND.

IMPROVEMENT IN EVAPORATING-PANS.

Specification forming part of Letters Patent No. 186,940, dated February 6, 1877; application filed July 6, 1875.

*To all whom it may concern:*

Be it known that I, JAMES THOMAS LOCKEY, of Northwich, in the county of Chester, England, have invented certain Improvements in Evaporating-Pan, of which the following is a specification:

My invention relates to reverberatory furnaces or combustion-chambers in which minerals are calcined, or gas-retorts heated by the gaseous products of combustion from two or more furnaces, and which gaseous products are afterward brought through flues below evaporating-pans or drying-floors until most of their heat is extracted, when they are permitted to escape into the atmosphere. The draft is increased by means of a steam-jet.

Figure 1 is a front elevation of furnaces and pan, such as I use for evaporating brine, the right-hand half being a sectional view through X Y of Fig. 2. Fig. 2 is a plan from the right-hand half of which the pan is removed.

A A are ordinary furnaces, with bars, firedoor, &c., similar to those generally used in heating-boilers, reverberatory furnaces, &c. These are separated by party-walls from the reverberatory furnace B, the gases going from A to B by means of a flue at the back of the furnace. (Shown in dotted lines at C.)

I generally arrange this flue, when space will permit, to proceed from near the top of the actual furnace, and open into the reverberatory furnace, near the bottom of the same. In B the gas-retorts, limestone, or ores requiring a strong heat are placed. D D are brick flues open at one end to the flue E under the pan F, and at the other end to the furnace or kiln B. G is a steam-pipe brought from any convenient boiler, and having nozzles *e* concentric with each of the flues D D, so as to cause a strong draft through the flues by means of a small jet of steam.

Either of these flues D D can be used at pleasure, the other being temporarily stopped up. I prefer to have two instead of one central one, so as to have a spare one to use in case of accidental damage to the other, or both can be used together.

H H are the hurdles for draining the salt-crystals raked out of the pan; I, the brine-pipe for supplying the tank with brine. The pan F extends over the furnaces, but to shield it from the direct radiant heat, which would prove so injurious to it, I usually arch over the furnaces and kiln, leaving only a slit, *o*, a few inches wide, close to the front wall of the reverberatory furnace or kiln only, through which the gases escape into the flue E. The tendency of the steam-jet is to drive the gases at once straight through the center of the flue beneath the pan, leaving almost stagnant air in each side. To obviate this I make a split draft, and cause the gases to take a circuitous course by means of brick partitions K K.

When the gases have traversed the entire length of the pan, and in so doing have become divested of most of their heat, I allow them to escape by means of flues L L, (shown in dotted lines,) either into the chimney, or occasionally into the flues of a drying-floor or chamber, where they are still further divested of their heat.

I am aware that a steam-jet has been used for increasing the draft of furnaces before, and that the various parts of this invention, taken separately, are most of them old; but

What I claim as my invention is—

1. The combination of the evaporating-pan F, with the arched tops of the reverberatory furnace B, and one or more side furnaces, A, said furnaces being connected with side passages C, and the reverberatory furnace B having the narrow passage *o* at its front end, whereby the heat escaping from the main furnaces A is utilized to heat the pan, substantially as described.

2. In combination with the pan F arranged over the furnaces, as described, the baffle-walls K, passages *o*, and D, with the steam-jets *e*, all arranged to operate as and for the purpose set forth.

JAMES THOMAS LOCKEY.

Witnesses:
WM. P. THOMPSON,
E. G. COLTON.